United States Patent
Palazzolo et al.

(10) Patent No.: US 7,851,546 B2
(45) Date of Patent: Dec. 14, 2010

(54) LIQUID PLASTICIZING RESIN AND USE OF SUCH A RESIN

(75) Inventors: Rocco Palazzolo, 129 Boulevard Voltaire, 75011 Paris (FR); Moktar Mejladi, 44, rue de la Brégaudière, 45120 Cepoy (FR)

(73) Assignees: Rocco Palazzolo (FR); Moktar Mejladi (FR)

( * ) Notice: Subject to any disclaimer, the term of this patent is extended or adjusted under 35 U.S.C. 154(b) by 303 days.

(21) Appl. No.: 12/029,564

(22) Filed: Feb. 12, 2008

(65) Prior Publication Data

US 2008/0193661 A1 Aug. 14, 2008

(30) Foreign Application Priority Data

Feb. 12, 2007 (FR) .................................. 07 53180
Oct. 12, 2007 (FR) .................................. 07 07179

(51) Int. Cl.
*C08L 33/12* (2006.01)
*C08K 5/00* (2006.01)

(52) U.S. Cl. ...................... 524/561; 524/284; 524/315; 106/14.35; 106/14.41

(58) Field of Classification Search .............. 106/14.35, 106/14.41; 524/561, 284, 315
See application file for complete search history.

(56) References Cited

U.S. PATENT DOCUMENTS

| 4,526,913 A | * | 7/1985 | Winkler et al. ................ 524/31 |
| 6,395,913 B1 | * | 5/2002 | Barnicki et al. ............. 549/538 |
| 2008/0311386 A1 | * | 12/2008 | Wendt ........................ 428/331 |

FOREIGN PATENT DOCUMENTS

| FR | 1 266 719 | 7/1961 |
| FR | 2 462 770 | 2/1981 |

OTHER PUBLICATIONS

Aldrich Chemical Catalog, 4-methyl-2-pentanone, p. 1042, 1988.*

* cited by examiner

*Primary Examiner*—Tae H Yoon
(74) *Attorney, Agent, or Firm*—Lowe Hauptman Ham & Berner, LLP

(57) ABSTRACT

One subject of the invention is a liquid plasticizing resin intended to be coated. The liquid plasticizing resin is a methyl methacrylate/butyl methacrylate copolymer diluted in a suitable solvent. The solvent includes xylene; 2-methoxy-1-methylethyl acetate; ethylbenzene; 4-methyl-2-pentanone; n-butyl acetate; and alkylbenzyl ester. Another subject of the invention is the use of such a resin for protecting surfaces exposed to adverse weather conditions, light or chemical agents.

6 Claims, No Drawings

LIQUID PLASTICIZING RESIN AND USE OF SUCH A RESIN

RELATED APPLICATIONS

The present application is based on, and claims priority from, French Application Number 07 53180, filed Feb. 12, 2007 and French Application Number 07 07179, filed Oct. 12, 2007, the disclosures of which are hereby incorporated by reference herein in their entireties.

FIELD OF THE INVENTION

The present invention is directed to the filed of liquid plasticizing resin and more particularly, a liquid plasticizing resin including a methylacrylate/butyl methacrylate copolymer diluted in a suitable solvent.

BACKGROUND OF THE INVENTION

One subject of the present invention is a novel liquid plasticizing resin that notably makes it possible to provide consumers with a means of enabling them to protect themselves and, very simply, a wide range of surfaces which may be exposed to adverse weather conditions, light or chemical agents.

DIY (do-it-yourself) has become one of the preferred pastimes of our contemporaries, and with the increase in free time, more and more people are embarking on work which was previously the preserve of professionals.

SUMMARY OF THE INVENTION

In this context, the present invention proposes to the general public to use one particular liquid plasticizing resin for protecting the widest variety of surfaces.

According to the invention, this liquid plasticizing resin intended to be coated is characterized in that it comprises a methyl methacrylate/butyl methacrylate copolymer diluted in a suitable solvent, said solvent comprising, in addition:
  xylene;
  2-methoxy-1-methylethyl acetate;
  ethylbenzene;
  4-methyl-2-pentanone;
  n-butyl acetate; and
  alkylbenzyl ester.

Advantageously, the alkylbenzyl ester may comprise between 7 and 9 carbon atoms.

According to one variant of the invention, the resin may comprise, in addition, ethyl acetate.

According to a first variant of the invention, the plasticizing resin used in accordance with the invention may advantageously have the following composition, by weight:
  methyl methacrylate/butyl methacrylate copolymer: 30 to 60%;
  xylene: 10 to 20%;
  2-methoxy-1-methylethyl acetate: 2 to 3%;
  ethyl benzene: 2 to 3.5%;
  4-methyl-2-pentanone: 10 to 25%;
  ethyl acetate: 5 to 12%;
  n-butyl acetate: 5 to 20%; and
  alkylbenzyl ester: 4 to 6%.

According to one variant of the invention, the resin may comprise a light aromatic naphtha solvent.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

DESCRIPTION OF THE PREFERRED EMBODIMENT

The plasticizing resin used in accordance with the invention may advantageously have the following composition, by weight:
  methyl methacrylate/butyl methacrylate copolymer: 30 to 60%;
  xylene: 5 to 15%;
  2-methoxy-1-methylethyl acetate: 5 to 15%;
  ethylbenzene: 1 to 2.5%;
  4-methyl-2-pentanone: 10 to 25%;
  n-butyl acetate: 5 to 20%;
  alkylbenzyl ester: 5 to 10%; and
  light aromatic naphtha solvent: 5 to 15%.

According to this variant, the resin comprises a light aromatic naphtha enabling an improved application of the resin using a brush.

This second resin variant according to the invention makes it possible to provide a resin that is really easy to coat, notably due to a relatively high percentage of 2-methoxy-1-methylethyl acetate.

In addition, it has the advantage of allowing a very good adhesion due to an optimized percentage of alkylbenzyl ester.

According to the invention, the liquid plasticizing resin may, in addition, contain various additives such as anti-bubbling agents, scratch-resistant agents or stabilizers.

Besides its ease of application, such a liquid plasticizing resin is distinguished by its transparent and invisible appearance and its waterproofing, antioxidant and antistatic properties.

In addition, it has the advantage of being resistant to ultraviolet rays, of not being subject to yellowing phenomena over time, and of not cracking nor crazing, and this even when it is applied to flexible substrates such as fabrics.

According to another feature of the invention, the liquid plasticizing resin is applied to the surface to be protected using a roller or a brush, which proves particularly practical for the consumers.

One liter of the liquid plasticizing resin used in accordance with the invention makes it possible to cover and consequently protect a surface of around 20 m$^2$.

Thus, on this surface a film is obtained which dries relatively rapidly; therefore the application of a second layer of resin may be carried out around two hours after the application of the first layer.

The maximum strength of the film is however only achieved twenty-four hours after its application.

The invention therefore makes it possible to apply a protective film over a wide range of surfaces that is distinguished, in particular, by remarkable elasticity, hardness and gloss properties and moreover by a lack of toxicity after drying.

This protective film furthermore has the advantage of being stable over time, and this at intermittent temperatures up to 180° C. or down to −50° C., and of being resistant to atmospheric agents, to seawater spray, to ultraviolet rays, to acids for domestic use, to detergents, to hydrocarbons and to lubricating oils.

The only limitation to the use of the liquid plasticizing resin, used in accordance with the invention, is linked to the fact that it is not resistant to acetone and to similar solvents.

In accordance with the invention, this liquid plasticizing resin may advantageously be used for protecting surfaces made of wood, stone, metal, fabric, paper, leather, rigid plastics, tiled flooring, cement or ceramic.

Such a resin is, by way of example, particularly suitable for being applied to surfaces made of chrome, iron, aluminium, copper, brass or zinc or to bituminous supports.

Such surfaces may be produced both as porous materials and as materials that have already been varnished, painted or enamelled; the liquid plasticizing resin used in accordance with the invention is, in particular, compatible with the majority of paints or varnishes.

It should however be noted that this resin cannot be applied to silicone-based supports, expanded polystyrene, fabrics made of synthetic fibres and soft plastics.

According to another feature of the invention, the liquid plasticizing resin may be used to seal supports and surfaces such as walls, floors and ceilings.

It is thus possible to obtain protective films that render joints 100% waterproof and to block any water or liquid seepage.

According to another feature of the invention, the liquid plasticizing resin may be used for protecting metal surfaces against oxidation and graffiti.

According to another feature of the invention, the liquid plasticizing resin may be used for waterproofing surfaces made of canvas such as tents, parasols or sunshades and protecting them against UV radiation.

Such canvas surfaces may thus keep their original colour on a long-term basis without being the subject of yellowing phenomena.

According to another feature of the invention, the liquid plasticizing resin may be used for protecting garden furniture against adverse weather conditions and in the winter months.

It is thus possible to use such furniture outside all winter without having to store it.

According to another feature of the invention, the liquid plasticizing resin may be used for protecting boat hulls against seawater.

Such a resin may, more generally, be used for protecting any products, notably metal products, against the damaging effects of seawater.

It should be noted that the liquid plasticizing resin used in accordance with the invention may also be applied using a paint spray gun, but that for this purpose it must be diluted to 10% with a dry diluent.

It will be readily seen by one of ordinary skill in the art that the present invention fulfils all of the objects set forth above.

After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A liquid plasticizing resin intended to be coated, comprising:
   a methyl methacrylate/butyl methacrylate copolymer diluted in a solvent; said solvent comprising:
   xylene;
   2-methoxy-1-methylethyl acetate;
   ethylbenzene;
   4-methyl-2-pentanone;
   n-butyl acetate; and
   alkylbenzyl ester.

2. The liquid plasticizing resin intended to be coated according to claim 1, further comprising, ethyl acetate.

3. The liquid plasticizing resin intended to be coated according to claim 2, comprising the following weight percentages:
   methyl methacrylate/butyl methacrylate copolymer: 30 to 60%;
   xylene: 10 to 20%;
   2-methoxy-1-methylethyl acetate: 2 to 3%;
   ethylbenzene: 2 to 3.5%;
   4-methyl-2-pentanone: 10 to 25%;
   ethyl acetate: 5 to 12%;
   n-butyl acetate: 5 to 20%; and
   alkylbenzyl ester: 4 to 6%.

4. The liquid plasticizing resin intended to be coated according to claim 1, further comprising, a light aromatic naphtha solvent.

5. The liquid plasticizing resin intended to be coated according to claim 4, comprising the following weight percentages:
   methyl methacrylate/butyl methacrylate copolymer: 30 to 60%;
   xylene: 5 to 15%;
   2-methoxy-1-methylethyl acetate: 5 to 15%;
   ethylbenzene: 1 to 2.5%;
   4-methyl-2-pentanone: 10 to 25%;
   n-butyl acetate: 5 to 20%;
   alkylbenzyl ester: 5 to 10%; and
   light aromatic naphtha solvent: 5 to 15%.

6. Liquid plasticizing resin intended to be coated according to claim 1, comprising, additives including at least one of anti-bubbling agents, scratch-resistant agents and stabilizers.

* * * * *